(12) United States Patent
Niwa

(10) Patent No.: US 11,582,408 B2
(45) Date of Patent: Feb. 14, 2023

(54) EVENT IMAGE SENSOR, IMAGING DEVICE, AND METHOD OF CONTROLLING EVENT IMAGE SENSOR

(71) Applicant: Sony Semiconductor Solutions Corporation, Kanagawa (JP)

(72) Inventor: Atsumi Niwa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 187 days.

(21) Appl. No.: 16/964,676

(22) PCT Filed: Dec. 14, 2018

(86) PCT No.: PCT/JP2018/046045
§ 371 (c)(1),
(2) Date: Jul. 24, 2020

(87) PCT Pub. No.: WO2019/150786
PCT Pub. Date: Aug. 8, 2019

(65) Prior Publication Data
US 2020/0351455 A1    Nov. 5, 2020

(30) Foreign Application Priority Data
Jan. 31, 2018 (JP) .............................. JP2018-014228

(51) Int. Cl.
*H04N 5/353* (2011.01)
*H04N 5/232* (2006.01)
(Continued)

(52) U.S. Cl.
CPC .......... *H04N 5/353* (2013.01); *H04N 5/23245* (2013.01); *H04N 5/351* (2013.01);
(Continued)

(58) Field of Classification Search
CPC ...... H04N 5/351; H04N 5/353; H04N 5/3745; H04N 5/76; H04N 5/772; H04N 5/3535; H04N 5/23245; G03B 30/00; B60R 11/04
See application file for complete search history.

(56) References Cited

U.S. PATENT DOCUMENTS

| | | | |
|---|---|---|---|
| 2016/0094796 A1* | 3/2016 | Govil | H04N 5/37452 348/295 |
| 2016/0094814 A1* | 3/2016 | Gousev | H04N 7/183 348/143 |
| 2018/0167575 A1* | 6/2018 | Watanabe | H04N 5/3745 |

FOREIGN PATENT DOCUMENTS

| | | |
|---|---|---|
| CN | 101715077 A | 5/2010 |
| CN | 103782587 A | 5/2014 |

(Continued)

*Primary Examiner* — Twyler L Haskins
*Assistant Examiner* — Akshay Trehan
(74) *Attorney, Agent, or Firm* — Michael Best & Friedrich LLP

(57) ABSTRACT

In a solid-state image sensor that detects an address event, the detection sensitivity for the address event is controlled to an appropriate value.

The solid-state image sensor includes a pixel array unit and a control unit. In the solid-state image sensor, multiple pixel circuits are arranged in the pixel array unit, each detecting a change in luminance of incident light occurring outside a predetermined dead band as the address event. The control unit controls the width of the dead band according to the number of times the address event is detected in the pixel array unit within a fixed unit cycle.

14 Claims, 14 Drawing Sheets

(51) Int. Cl.
*H04N 5/351* (2011.01)
*H04N 5/3745* (2011.01)
*H04N 5/76* (2006.01)
*H04N 5/77* (2006.01)
*B60R 11/04* (2006.01)

(52) U.S. Cl.
CPC ............ *H04N 5/3745* (2013.01); *H04N 5/76* (2013.01); *H04N 5/772* (2013.01); *B60R 11/04* (2013.01)

(56) References Cited

FOREIGN PATENT DOCUMENTS

| JP | 2016-501495 A | 1/2016 |
| JP | 2017-535999 A | 11/2017 |
| WO | 2017/013806 A1 | 1/2017 |

* cited by examiner a b c a b c a b

| AREA IDENTIFICATION NUMBER | NUMBER OF TIMES OF DETECTION | DEAD BAND UPPER LIMIT | DEAD BAND LOWER LIMIT |
|---|---|---|---|
| 01 | 15 | U01 | L01 |
| 02 | 0 | U02 | L02 |
| 03 | 10 | U03 | L03 |
| 04 | 12 | U04 | L04 |
| ⋮ | ⋮ | ⋮ | ⋮ |

EVENT IMAGE SENSOR, IMAGING DEVICE, AND METHOD OF CONTROLLING EVENT IMAGE SENSOR

TECHNICAL FIELD

The present technology relates to a solid-state image sensor, an imaging device, and a method of controlling a solid-state image sensor. Specifically, the present technology relates to a solid-state image sensor that detects a change in luminance, an imaging device, and a method of controlling a solid-state image sensor.

BACKGROUND ART

Conventionally, a synchronous solid-state image sensor that captures image data (frame) in synchronization with a synchronization signal such as a vertical synchronization signal has been used in an imaging device or the like. With this general synchronous solid-state image sensor, image data can be acquired only at every synchronization signal cycle (e.g., 1/60 second). Hence, it is difficult to deal with requests for higher-speed processing in fields such as traffic and robots. Against this background, an asynchronous solid-state image sensor has been proposed that detects a change in luminance as an address event in real time for each pixel address (see Patent Document 1, for example). Such a solid-state image sensor that detects an address event for each pixel is called a dynamic vision sensor (DVS).

CITATION LIST

Patent Document

Patent Document 1: Japanese Patent Application Laid-Open No. 2016-501495

SUMMARY OF THE INVENTION

Problems to be Solved by the Invention

The asynchronous solid-state image sensor (i.e., DVS) described above can generate and output data at a much higher speed than the synchronous solid-state image sensor. For this reason, in the traffic field, for example, processing of recognizing an image of a person or an obstacle can be executed at high speed, and safety can be improved. However, in the above-mentioned solid-state image sensor, it is difficult to control the detection sensitivity for an address event to an appropriate value. For example, if the detection sensitivity for the address event is too low, there is a possibility that the obstacle detection may fail in the image recognition. On the other hand, if the detection sensitivity for the address event is too high, the address event may be excessively detected when the luminance of all pixels changes due to a change in illumination or the like, and power consumption may increase.

The present technology has been made in view of such a situation, and an object of the present technology is to control the detection sensitivity for an address event to an appropriate value in a solid-state image sensor that detects an address event.

Solutions to Problems

The present technology has been made to solve the above-mentioned problems, and a first aspect thereof is a solid-state image sensor including a pixel array unit in which multiple pixel circuits are arranged, each pixel circuit detecting a change in luminance of incident light occurring outside a predetermined dead band as an address event, and a control unit that controls a width of the dead band according to the number of times the address event is detected in the pixel array unit within a fixed unit cycle, and a method of controlling the solid-state image sensor. This brings about the effect that an address event is detected outside a dead band having a width corresponding to the number of times of detection.

Additionally, in the first aspect, the control unit may widen the dead band as the number of times of detection increases. This brings about the effect that an address event is detected outside a wider dead band as the number of times of detection increases.

Additionally, in the first aspect, each of the multiple pixel circuits may compare each of the upper limit and the lower limit of the dead band with the amount of change in the luminance, and detect the address event on the basis of the comparison result. This brings about the effect that an address event is detected on the basis of the result of comparison between each of the upper limit and the lower limit of the dead band and the amount of change in the luminance.

Additionally, in the first aspect, the control unit may control the width of the dead band in a case where the number of times of detection is outside a predetermined allowable range. This brings about the effect that an address event is detected outside a dead band having a width corresponding to the number of times of detection outside the allowable range.

Additionally, in the first aspect, the pixel array unit may be divided into multiple areas, and the control unit may control the width of the dead band for each of the multiple areas. This brings about the effect that an address event is detected outside a dead band having a width controlled for each area.

Additionally, in the first aspect, each of the multiple pixel circuits may include a photoelectric conversion element that photoelectrically converts the incident light to generate a photocurrent, and a current-voltage conversion circuit that converts the photocurrent into a voltage. The photoelectric conversion element may be arranged on a light receiving chip, and the current-voltage conversion circuit may be arranged on a detection chip laminated on the light receiving chip. This brings about the effect that an address event is detected by the circuits arranged in a distributed manner on each of the light receiving chip and the detection chip.

Additionally, a second aspect of the present technology is an imaging device including: a pixel array unit in which multiple pixel circuits are arranged, each pixel circuit detecting a change in luminance of incident light occurring outside a predetermined dead band as an address event; a control unit that controls a width of the dead band according to the number of times the address event is detected in the pixel array unit within a fixed unit cycle; and a recording unit that records data obtained from a detection result of the address event. This brings about the effect that an address event is detected outside a dead band having a width corresponding to the number of times of detection, and data obtained from the detection result is recorded.

Effects of the Invention

According to the present technology, in a solid-state image sensor that detects an address event, an excellent effect that the detection sensitivity for an address event can be controlled to an appropriate value can be obtained. Note that the effect described herein is not necessarily limited, and the effect may be any of those described in the present disclosure.

BRIEF DESCRIPTION OF DRAWINGS

FIG. 13 is a diagram showing an example of information held in a memory in the second embodiment of the present technology.

MODE FOR CARRYING OUT THE INVENTION

Hereinafter, modes for carrying out the present technology (hereinafter referred to as embodiments) will be described. The description will be given in the following order.
1. First embodiment (example of controlling dead band width according to the number of times of detections)
2. Second embodiment (example of controlling dead band width according to the number of times of detections for each area)
3. Example of application to movable body>

1. First Embodiment

Configuration Example of Imaging Device

Figure 1:
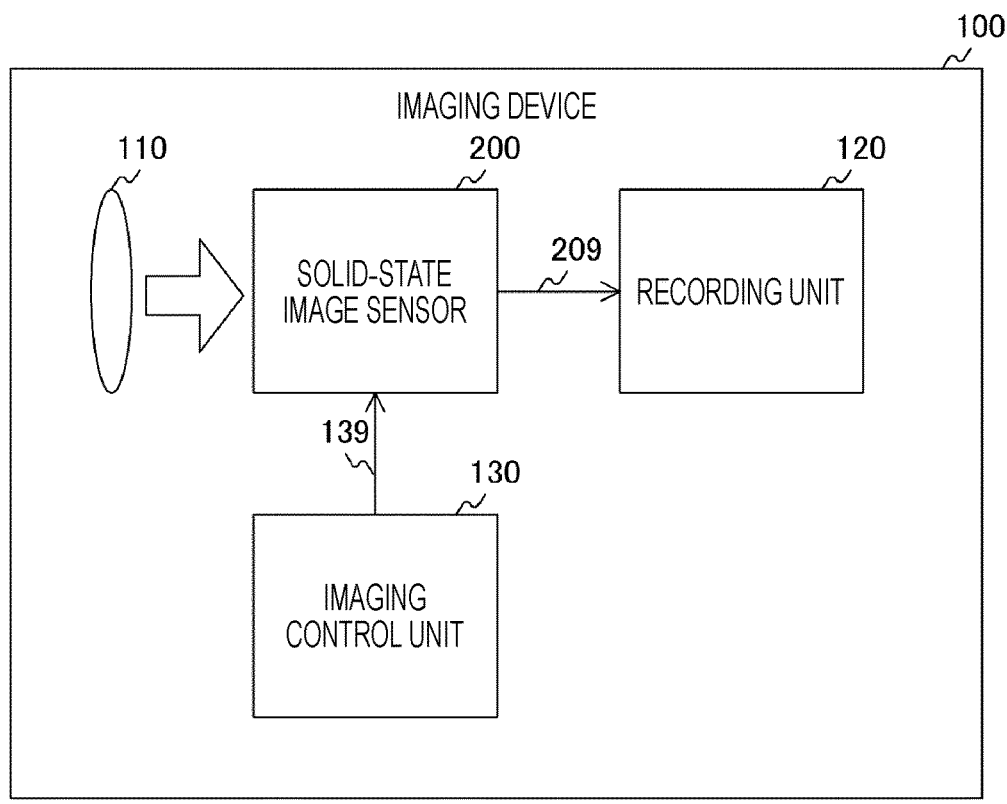
FIG. 1 is a block diagram showing a configuration example of an imaging device of a first embodiment of the present technology.

FIG. 1 is a block diagram showing a configuration example of an imaging device 100 of a first embodiment of the present technology. The imaging device 100 includes an imaging lens 110, a solid-state image sensor 200, a recording unit 120, and an imaging control unit 130. As the imaging device 100, a camera mounted on an industrial robot, an in-car camera, or the like is assumed.

The imaging lens 110 collects incident light and guides it to the solid-state image sensor 200. The solid-state image sensor 200 photoelectrically converts incident light to detect an address event, and executes predetermined processing such as object recognition on the basis of the detection result. The solid-state image sensor 200 supplies data indicating the execution result to the recording unit 120.

The recording unit 120 records the data from the solid-state image sensor 200. The imaging control unit 130 controls the solid-state image sensor 200 and causes the solid-state image sensor 200 to start the detection of an address event.

Configuration Example of Solid-state Image Sensor

Figure 2:
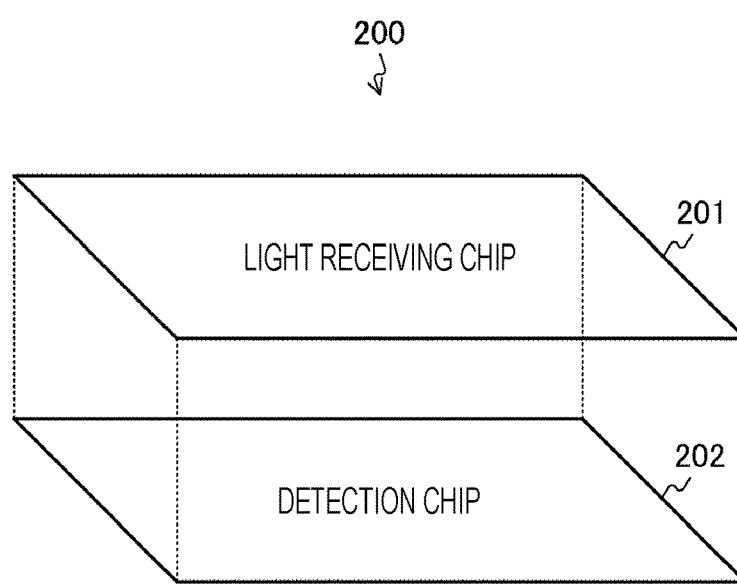
FIG. 2 is a diagram showing an example of a laminated structure of a solid-state image sensor of the first embodiment of the present technology.

FIG. 2 is a diagram showing an example of a laminated structure of the solid-state image sensor 200 of the first embodiment of the present technology. The solid-state image sensor 200 includes a detection chip 202 and a light receiving chip 201 laminated on the detection chip 202. These chips are electrically connected through a connection part such as a via. Note that other than vias, Cu-Cu bonding or bumps can be used for connection.

Figure 3:
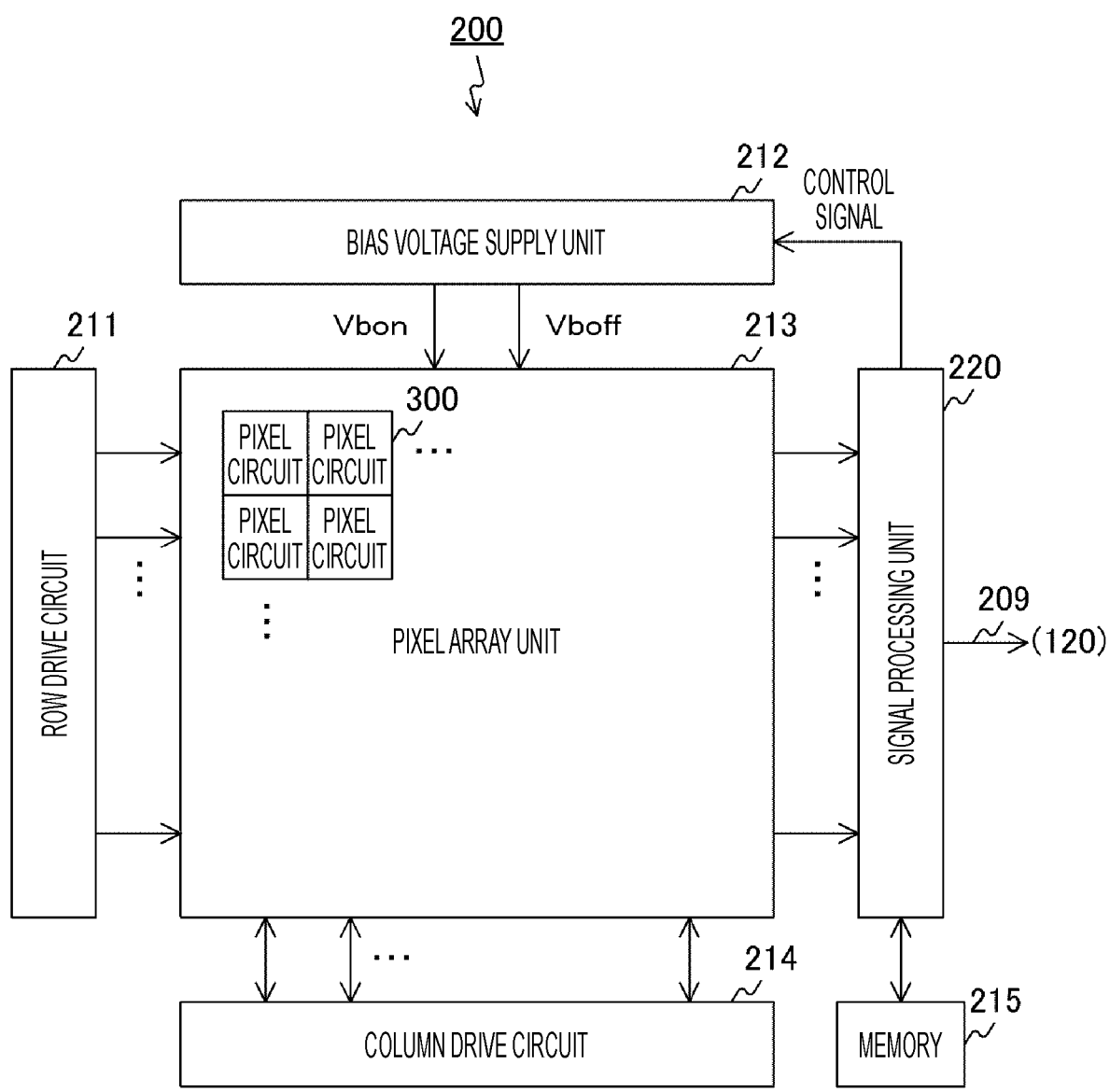
FIG. 3 is a block diagram showing a configuration example of the solid-state image sensor of the first embodiment of the present technology.

FIG. 3 is a block diagram showing a configuration example of the solid-state image sensor 200 of the first embodiment of the present technology. The solid-state image sensor 200 includes a row drive circuit 211, a bias voltage supply unit 212, a pixel array unit 213, a column drive circuit 214, a signal processing unit 220, and a memory 215.

Additionally, in the pixel array unit 213, multiple pixel circuits 300 are arranged in a two-dimensional lattice shape. Hereinafter, a set of pixel circuits 300 arranged in the horizontal direction is referred to as a "row", and a set of pixel circuits 300 arranged in a direction perpendicular to the row is referred to as a "column".

The pixel circuit 300 detects a change in luminance that occurs outside a predetermined dead band as an address event, and generates a detection signal indicating the detection result. Here, a dead band indicates a range of the amount of change in luminance where no address event is detected. A bias voltage Vbon indicating the upper limit of the dead band and a bias voltage Vboff indicating the lower limit of the dead band are supplied to each of the multiple pixel circuits 300.

Additionally, an address event includes an on event and an off event. An on event is detected when the amount of change in luminance is larger than the upper limit (Vbon) of the dead band. On the other hand, an off event is detected when the amount of change in luminance is smaller than the lower limit (Vboff) of the dead band. A detection signal includes a 1-bit signal indicating the on-event detection result and a 1-bit signal indicating the off-event detection result. Note that while the pixel circuit 300 detects both an on event and an off event, the pixel circuit 300 may detect only one of them.

The row drive circuit 211 drives each of the rows to generate a detection signal. When the pixel circuit 300 in a driven row detects an address event, the pixel circuit 300 supplies a request for transmitting a detection signal to the column drive circuit 214.

The column drive circuit 214 deals with each request of the column and returns a response on the basis of the dealt result. The pixel circuit 300 that has received the response supplies the detection signal to the signal processing unit 220.

The signal processing unit 220 performs predetermined image processing such as image recognition on the detection signal. The signal processing unit 220 supplies data indicating the processing result to the recording unit 120.

Additionally, for every fixed unit cycle, the signal processing unit 220 counts the number of times of detection, which is the number of times an address event is detected in the pixel array unit 213 within the cycle, and the number of times of detection is held in the memory 215. In a case where both the on event and the off event exist, the number of times of detection is counted every time either the on event or the off event is detected. For example, in a case where an on event is detected in 10 pixels, an off event is detected in 15 pixels, and no address event detected in the remaining pixels within a unit cycle, the number of times of detection is 25.

Then, the signal processing unit 220 reads the number of times of detection from the memory 215, and controls the difference between the bias voltages Vbon and Vboff (i.e., dead band width) by transmitting a control signal according to the number of times of detection. For example, the signal processing unit 220 widens the dead band as the number of times of detection increases. Here, the control signal is a signal for instructing the bias voltage supply unit 212 to increase or decrease each of the bias voltages Vbon and Vboff. Note that the signal processing unit 220 is an example of a control unit described in "CLAIMS".

The bias voltage supply unit 212 generates the bias voltages Vbon and Vboff according to the control signal from the signal processing unit 220, and supplies them to all the pixel circuits 300. The memory 215 holds the number of times of detection and the upper and lower limits of the dead band.

Configuration Example of Pixel Circuit

Figure 4:
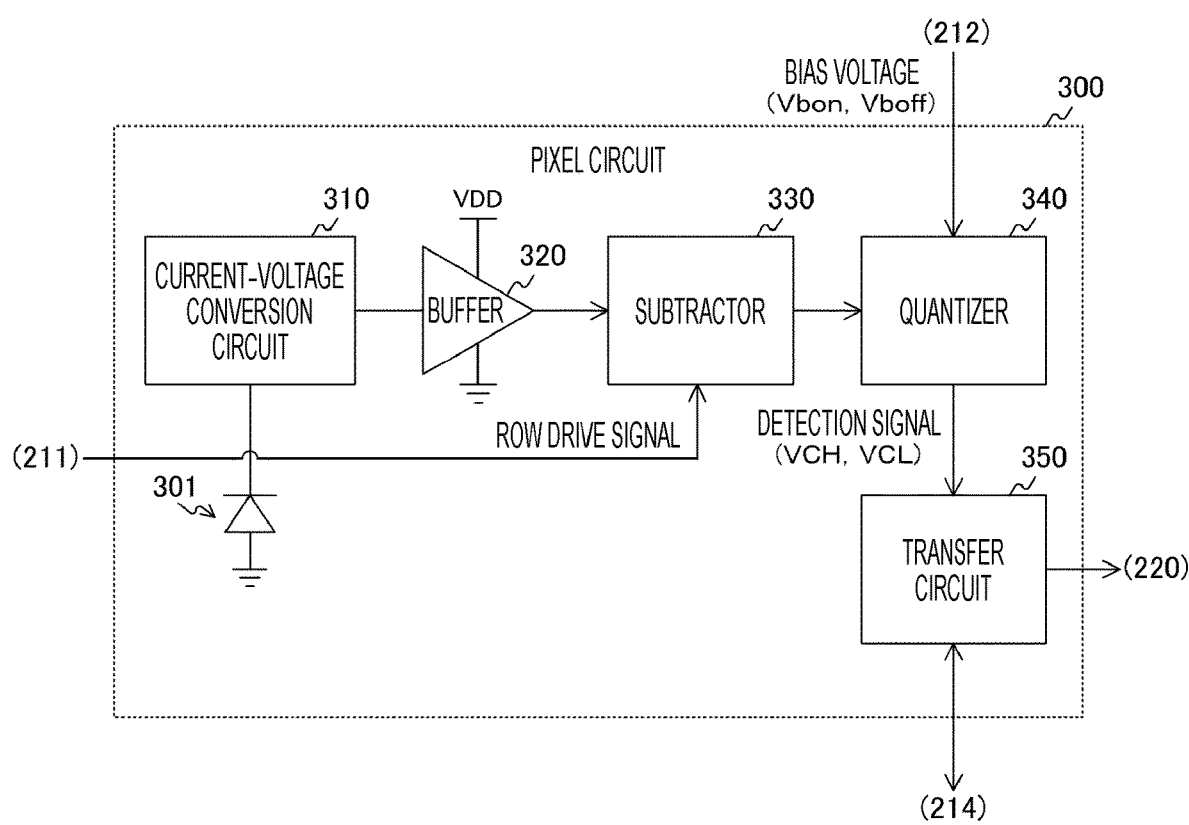
FIG. 4 is a block diagram showing a configuration example of a pixel circuit of the first embodiment of the present technology.

FIG. 4 is a block diagram showing a configuration example of the pixel circuit 300 of the first embodiment of the present technology. The pixel circuit 300 includes a photoelectric conversion element 301, a current-voltage conversion circuit 310, a buffer 320, a subtractor 330, a quantizer 340, and a transfer circuit 350.

The photoelectric conversion element 301 photoelectrically converts incident light to generate an optical signal. The photoelectric conversion element 301 supplies the generated photocurrent to the current-voltage conversion circuit 310.

The current-voltage conversion circuit 310 converts the photocurrent from the photoelectric conversion element 301 into a logarithmic voltage signal. The current-voltage conversion circuit 310 supplies the voltage signal to the buffer 320.

The buffer 320 corrects the voltage signal from the current-voltage conversion circuit 310. The buffer 320 outputs the corrected voltage signal to the subtractor 330.

The subtractor 330 lowers the level of the voltage signal from the buffer 320 according to a row drive signal from the row drive circuit 211. The subtractor 330 supplies the signal with lowered level to the quantizer 340 as a differential signal.

The quantizer 340 quantizes the differential signal from the subtractor 330 into a digital signal and outputs it as a detection signal to the transfer circuit 350.

The transfer circuit 350 transfers the detection signal from the quantizer 340 to the signal processing unit 220. The transfer circuit 350 supplies a request for transmitting a detection signal to the column drive circuit 214 when an address event is detected. Then, when the transfer circuit 350 receives a response to the request from the column drive circuit 214, the transfer circuit 350 supplies the detection signal to the signal processing unit 220.

Configuration Example of Current-voltage Conversion Circuit

Figure 5:
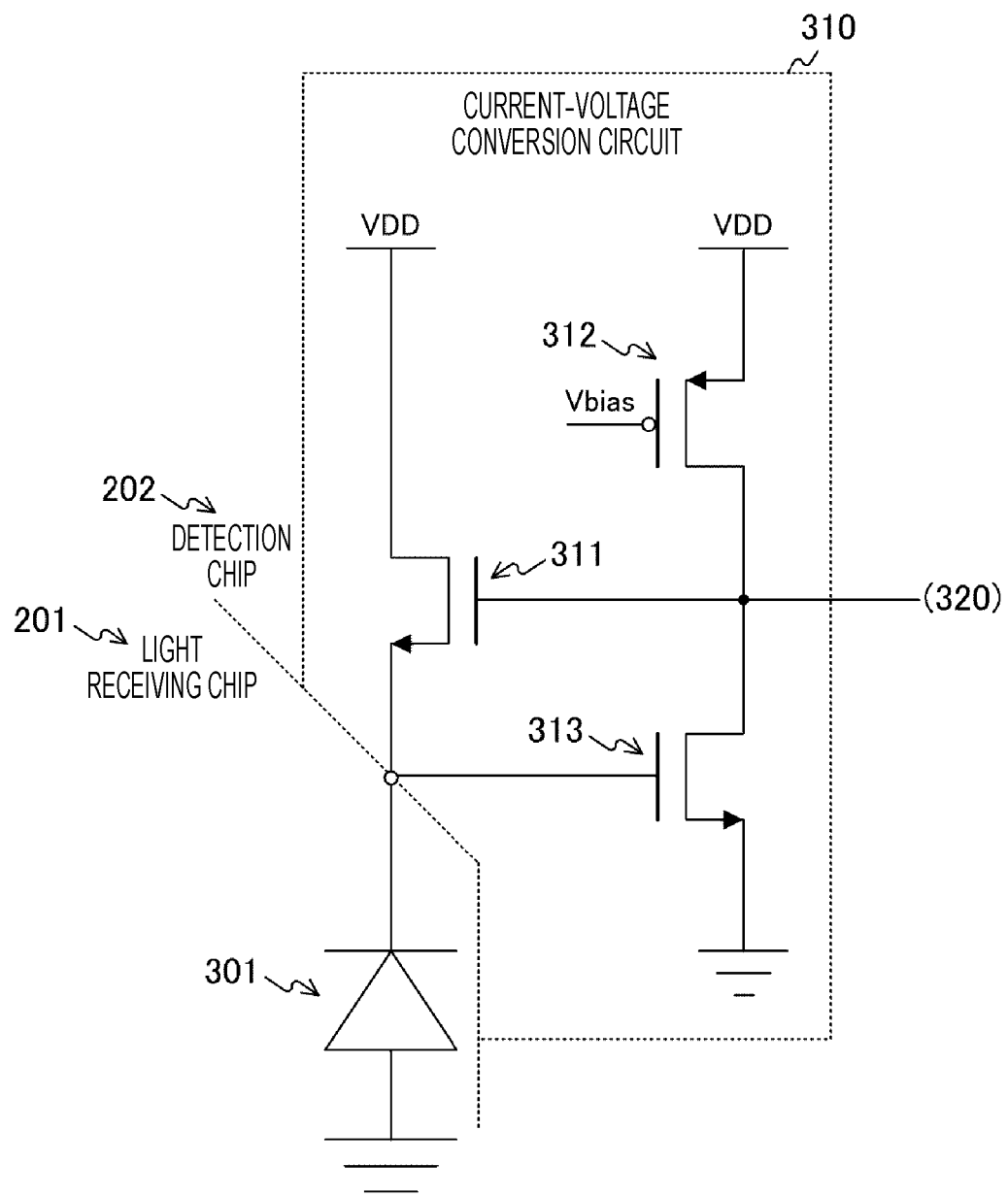
FIG. 5 is a circuit diagram showing a configuration example of a current-voltage conversion circuit of the first embodiment of the present technology.

FIG. 5 is a circuit diagram showing a configuration example of the current-voltage conversion circuit 310 of the first embodiment of the present technology. The current-voltage conversion circuit 310 includes N-type transistors 311 and 313 and a P-type transistor 312. Metal-oxide-semiconductor (MOS) transistors are used as these transistors, for example.

The N-type transistor 311 has a source connected to the photoelectric conversion element 301 and a drain connected to a power supply terminal. The P-type transistor 312 and the N-type transistor 313 are connected in series between the power supply terminal and the ground terminal. Additionally, the connection point of the P-type transistor 312 and the N-type transistor 313 is connected to the gate of the N-type transistor 311 and an input terminal of the buffer 320. Additionally, a predetermined bias voltage Vbias is applied to the gate of the P-type transistor 312.

The drains of the N-type transistors 311 and 313 are connected to the power supply side, and such a circuit is called a source follower. These two source followers connected in a loop convert the photocurrent from the photoelectric conversion element 301 into a logarithmic voltage signal. Additionally, the P-type transistor 312 supplies a constant current to the N-type transistor 313.

Additionally, in each of the pixel circuits 300, the photoelectric conversion element 301 is arranged on the light receiving chip 201. On the other hand, circuits and elements other than the photoelectric conversion element 301 are arranged on the detection chip 202.

Configuration Example of Buffer, Subtractor, and Quantizer

Figure 6:
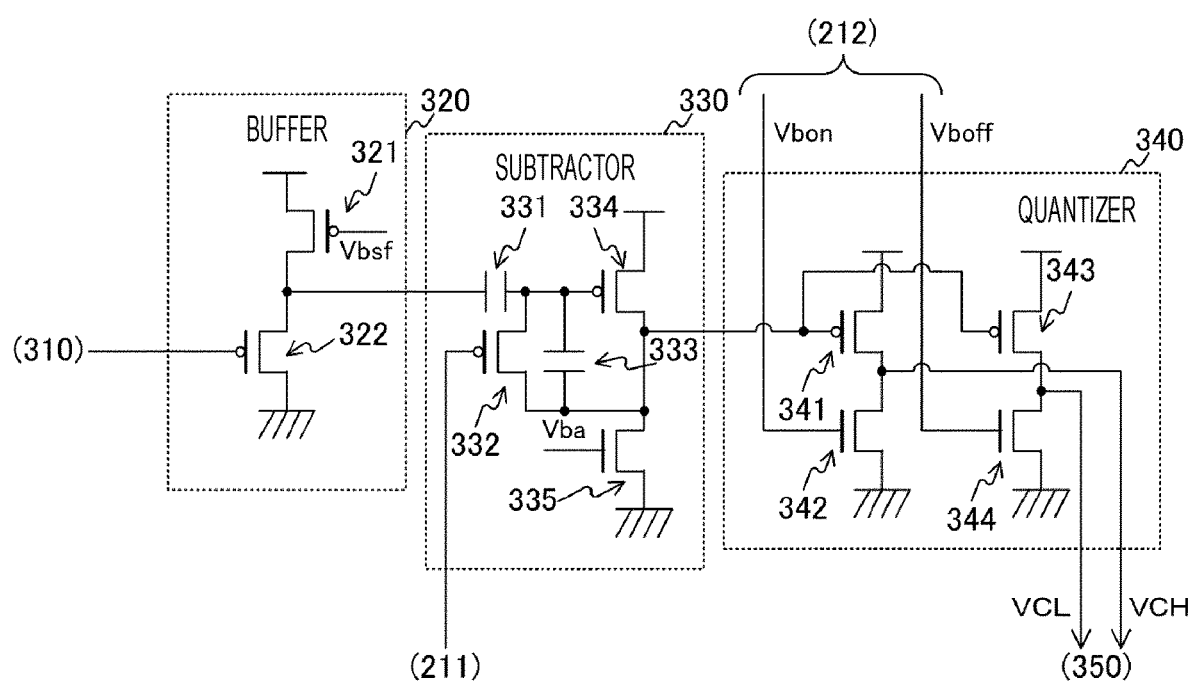
FIG. 6 is a circuit diagram showing a configuration example of a buffer, a subtractor, and a quantizer of the first embodiment of the present technology.

FIG. 6 is a circuit diagram showing a configuration example of the buffer 320, the subtractor 330, and the quantizer 340 of the first embodiment of the present technology.

The buffer 320 includes P-type transistors 321 and 322 connected in series between the power supply and the ground terminal. For example, MOS transistors are used as these transistors. The gate of the P-type transistor 322 on the ground side is connected to the current-voltage conversion circuit 310, and a bias voltage Vbsf is applied to the gate of the P-type transistor 321 on the power supply side. Additionally, the connection point of the P-type transistors 321 and 322 is connected to the subtractor 330. With this connection, impedance conversion is performed on the voltage signal from the current-voltage conversion circuit 310.

The subtractor 330 includes capacitors 331 and 333, P-type transistors 332 and 334, and an N-type transistor 335. For example, MOS transistors are used as these transistors.

One end of the capacitor 331 is connected to the buffer 320, and the other end is connected to one end of the capacitor 333 and the gate of the P-type transistor 334. The gate of the P-type transistor 332 receives input of a row drive signal from the row drive circuit 211, and the source and drain of the P-type transistor 332 are connected to both ends of the capacitor 333. The P-type transistor 334 and the N-type transistor 335 are connected in series between the power supply terminal and the ground terminal. Additionally, the other end of the capacitor 333 is connected to the connection point of the P-type transistor 334 and the N-type transistor 335. A bias voltage Vba is applied to the gate of the N-type transistor 335 on the ground side, and the connection point of the P-type transistor 334 and the N-type transistor 335 is also connected to the quantizer 340. With such a connection, a differential signal indicating the amount of change in luminance is generated and output to the quantizer 340.

The quantizer 340 includes P-type transistors 341 and 343, and N-type transistors 342 and 344. For example, MOS transistors are used as these transistors.

The P-type transistor 341 and the N-type transistor 342 are connected in series between the power supply terminal and the ground terminal, and the P-type transistor 343 and the N-type transistor 344 are also connected in series between the power supply terminal and the ground terminal. Additionally, the gates of the P-type transistors 341 and 343 are connected to the subtractor 330. The bias voltage Vbon is applied to the gate of the N-type transistor 342, and the bias voltage Vboff is applied to the gate of the N-type transistor 344.

The connection point of the P-type transistor 341 and the N-type transistor 342 is connected to the transfer circuit 350, and the voltage at the connection point is output as a detection signal VCH. The connection point of the P-type transistor 343 and the N-type transistor 344 is also connected to the transfer circuit 350, and the voltage at the connection point is output as a detection signal VCL. With such a connection, the quantizer 340 outputs the high-level detection signal VCH in a case where the differential signal exceeds the bias voltage Vbon, and outputs the low-level detection signal VCL in a case where the differential signal falls below the bias voltage Vboff. The detection signal VCH indicates the on-event detection result, and the detection signal VCL indicates the off-event detection result.

Note that while only the photoelectric conversion element 301 is arranged on the light receiving chip 201 and the other elements are arranged on the detection chip 202, the circuit to be arranged on each chip is not limited to this configuration. For example, the photoelectric conversion element 301 and the N-type transistors 311 and 313 may be arranged on the light receiving chip 201, and the others may be arranged on the detection chip 202. Alternatively, the photoelectric conversion element 301 and the current-voltage conversion circuit 310 may be arranged on the light receiving chip 201, and the others may be arranged on the detection chip 202. Alternatively, the photoelectric conversion element 301, the current-voltage conversion circuit 310, and the buffer 320 may be arranged on the light receiving chip 201, and the others may be arranged on the detection chip 202. Alternatively, the photoelectric conversion element 301, the current-voltage conversion circuit 310, the buffer 320, and the capacitor 331 may be arranged on the light receiving chip 201, and the others may be arranged on the detection chip 202. Alternatively, the photoelectric conversion element 301, the current-voltage conversion circuit 310, the buffer 320, the subtractor 330, and the quantizer 340 may be arranged on the light receiving chip 201, and the others may be arranged on the detection chip 202.

Configuration Example of Signal Processing Unit

Figure 7:
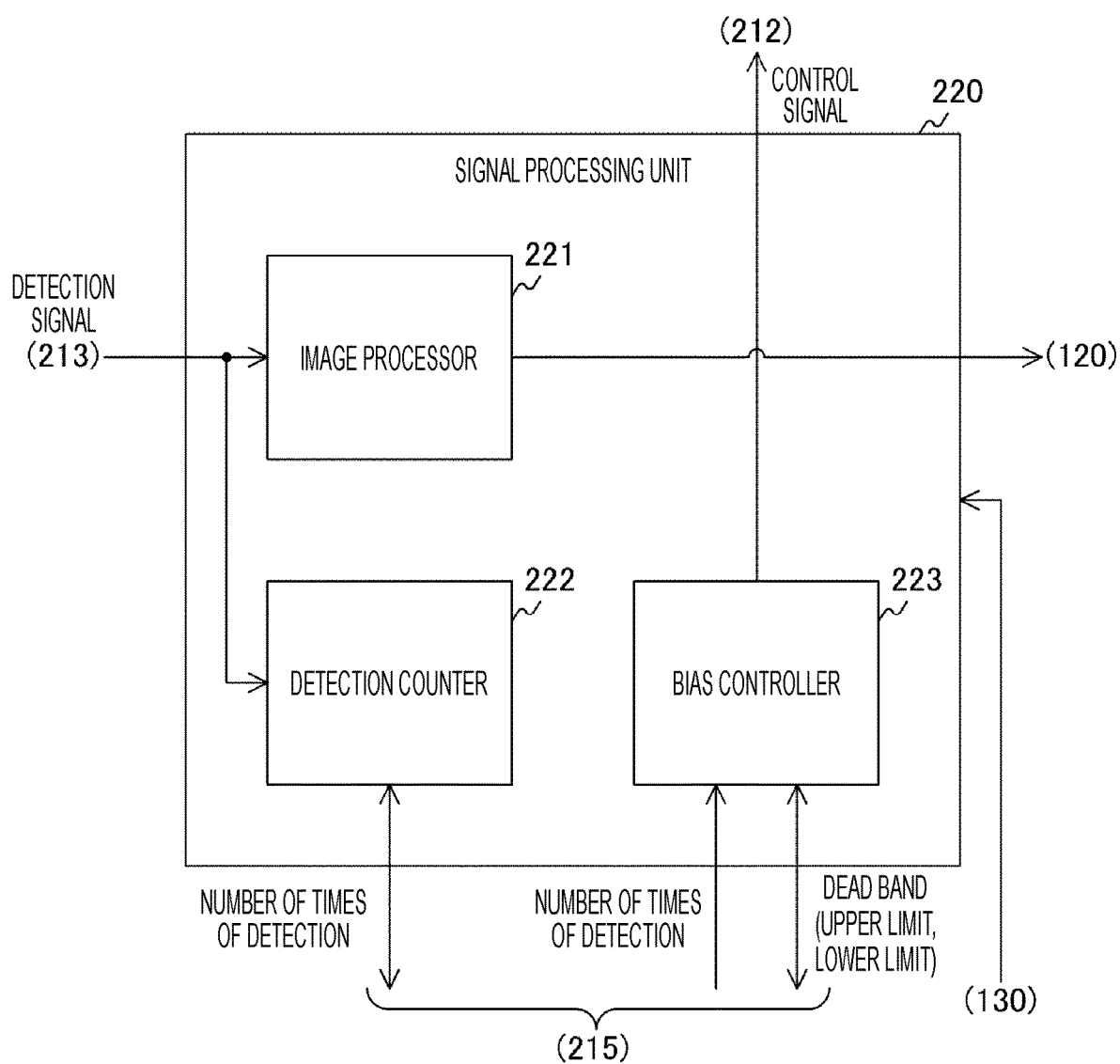
FIG. 7 is a block diagram showing a configuration example of a signal processing unit of the first embodiment of the present technology.

FIG. 7 is a block diagram showing a configuration example of the signal processing unit 220 of the first embodiment of the present technology. The signal processing unit 220 includes an image processor 221, a detection counter 222, and a bias controller 223.

The image processor 221 executes predetermined processing such as object recognition on the image data including the detection signal from the pixel array unit 213. The image processor 221 supplies the execution result to the recording unit 120. Note that the processing may be executed on the image data by a digital signal processor (DSP) or the like outside the solid-state image sensor 200, instead of by the image processor 221.

For every fixed unit cycle, the detection counter 222 counts the number of times an address event is detected by the pixel array unit 213 within the cycle. For every unit cycle, the detection counter 222 sets the number of times of detection in the memory 215 to an initial value at the start of the cycle. Then, each time an address event is detected, the detection counter 222 increments the number of times of detection and updates the number of times of detection with the incremented value. That is, the detection counter 222 counts up. Note that while the detection counter 222 counts up, it may count down instead.

The bias controller 223 controls the bias voltage according to the number of times of detection. The bias controller 223 sets the upper limit and the lower limit of the dead band in the memory 215 to the initial value when the imaging control unit 130 gives an instruction to start detection of an address event. Then, for every unit cycle, the bias controller 223 reads the number of times of detection from the memory 215 at the end of the cycle and determines whether or not the number of times of detection is a value within a predetermined allowable range.

In a case where the number of times of detection is outside the allowable range and is greater than the upper limit of the range, the bias controller 223 widens the dead band. For example, the bias controller 223 raises the upper limit of the dead band by a predetermined value, lowers the lower limit of the dead band by a predetermined value, and updates the memory 215 with the changed value. Additionally, the bias controller 223 controls the bias voltages Vbon and Vboff to values corresponding to the upper limit and the lower limit of the updated dead band by the control signal.

On the other hand, in a case where the number of times of detection is less than the lower limit of the allowable range, the bias controller 223 narrows the dead band. For example, the bias controller 223 lowers the upper limit of the dead band by a predetermined value, raises the lower limit of the dead band by a predetermined value, and updates the memory 215 with the changed value. Additionally, the bias controller 223 controls the bias voltages Vbon and Vboff to values corresponding to the upper limit and the lower limit of the updated dead band by the control signal.

Additionally, in a case where the number of times of detection is within the allowable range, the bias controller 223 does not control the width of the dead band and maintains the current value.

Note that while the bias controller 223 controls the width of the dead band only in a case where the number of times of detection is outside the allowable range, the dead band may be widened as the number of times of detection increases without providing the allowable range.

Additionally, while the bias controller 223 increases or decreases both the upper limit and the lower limit of the dead band, the width of the dead band can be controlled by increasing or decreasing only one of them.

Additionally, while the bias controller 223 does not limit the control amount of the dead band width, the dead band width can be controlled within a certain control range. For example, if the width of the dead band reaches the upper limit of the control range, the bias controller 223 does not widen the dead band any further even if the number of times of detection is greater than the upper limit of the allowable range. Additionally, if the width of the dead band reaches the lower limit of the control range, the bias controller 223 does not narrow the dead band any further even if the number of times of detection is less than the lower limit of the allowable range.

Figure 8:
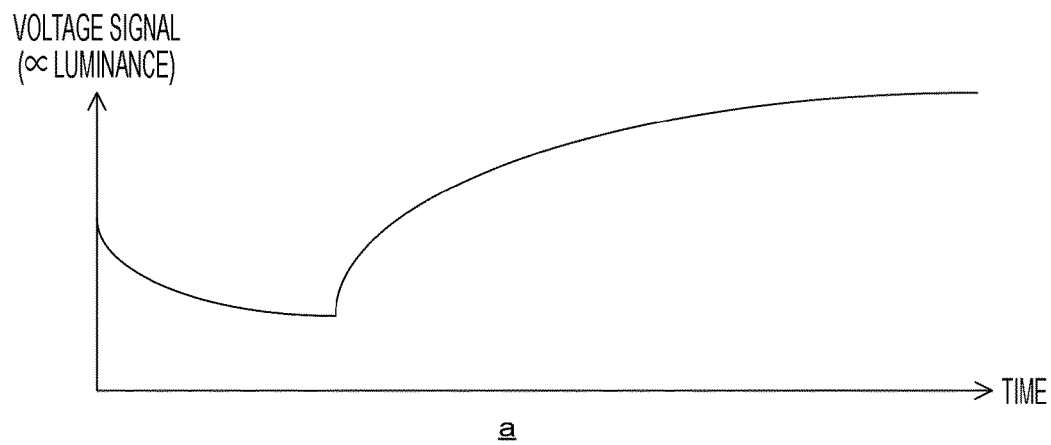
FIG. 8 is graphs showing an example of changes in a voltage signal, a differential signal, and a detection signal before widening a dead band in the first embodiment of the present technology.
Figure 8:
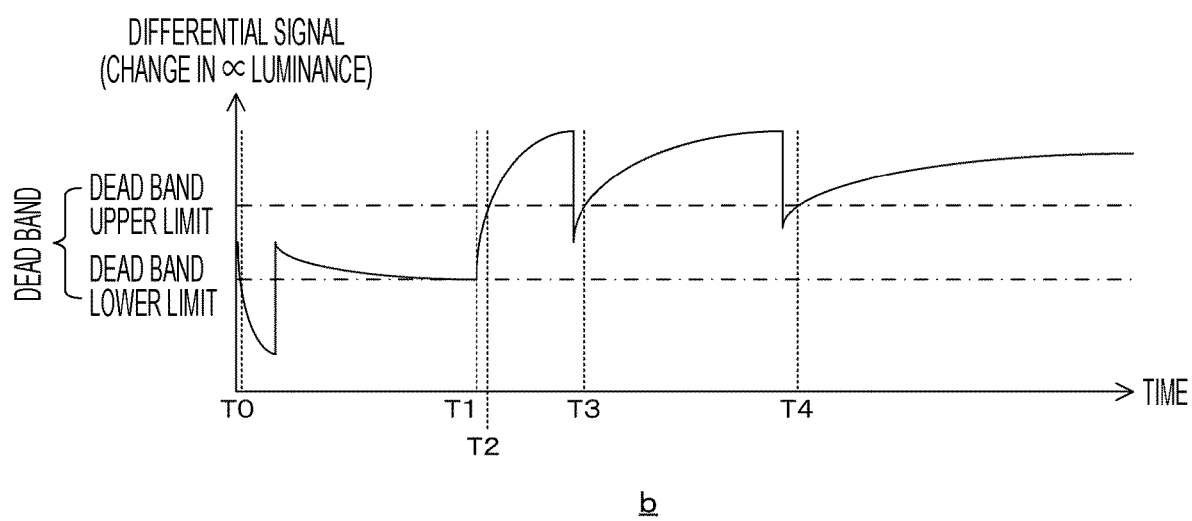
Figure 8:
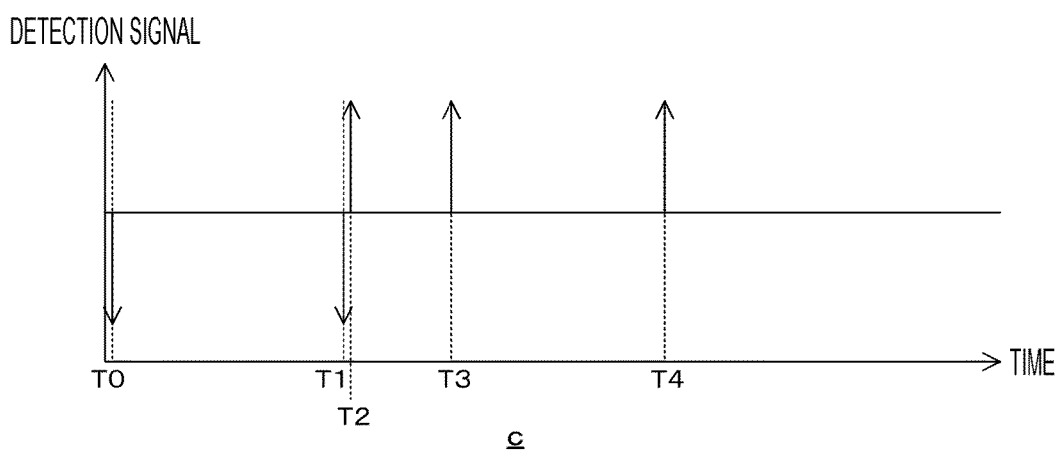

FIG. 8 is a graph showing an example of changes in a voltage signal, a differential signal, and a detection signal before widening the dead band in the first embodiment of the present technology. Here, a of FIG. 8 is a graph showing an example of changes in a voltage signal of a pixel, and b of FIG. 8 is a graph showing an example of changes in a differential signal of the pixel. Here, c of FIG. 8 is a graph showing an example of changes in a detection signal of the pixel. In a of FIG. 8, the vertical axis indicates the level of the voltage signal from the current-voltage conversion circuit 310, and the horizontal axis indicates time. In b of FIG. 8, the vertical axis indicates the level of the differential signal from the subtractor 330, and the horizontal axis indicates time. In c of FIG. 8, the vertical axis indicates the level of the detection signal from the quantizer 340, and the horizontal axis indicates time. In c of FIG. 8, an upward arrow indicates a detection signal when an on event is detected, and a downward arrow indicates a detection signal when an off event is detected.

When the luminance of light incident on a certain pixel changes, the voltage signal changes according to the change. Additionally, the differential signal indicating the amount of change in luminance also changes. Then, at timings T0 and T1, the level of the differential signal falls below the lower limit of the dead band, for example. Additionally, at timings T2, T3, and T4, the level of the differential signal exceeds the upper limit of the dead band. Hence, an off event is detected at the timings T0 and T1, and an on event is detected at the timings T2, T3, and T4. Additionally, in a case where the level of the differential signal is within the dead band, no address event is detected.

Here, it is assumed that the number of times of detection is greater than the upper limit of the allowable range, and the bias controller 223 widens the dead band.

Figure 9:
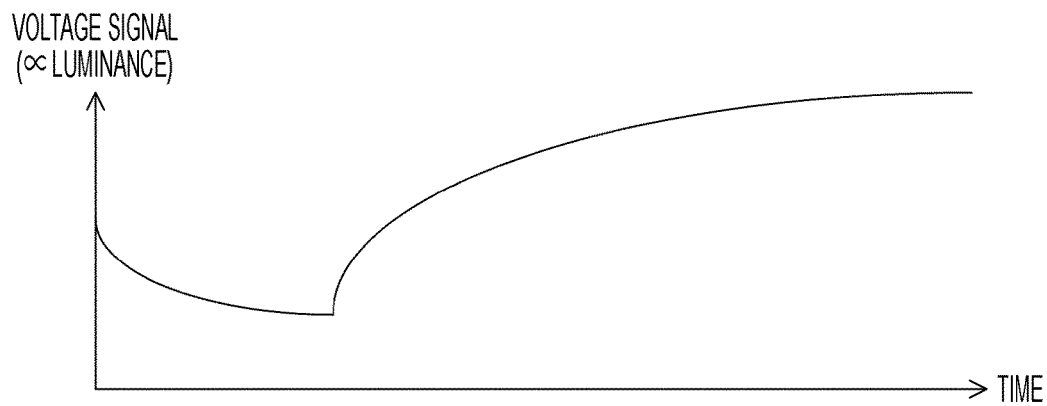
FIG. 9 is graphs showing an example of changes in the voltage signal, the differential signal, and the detection signal after widening the dead band in the first embodiment of the present technology.
Figure 9:
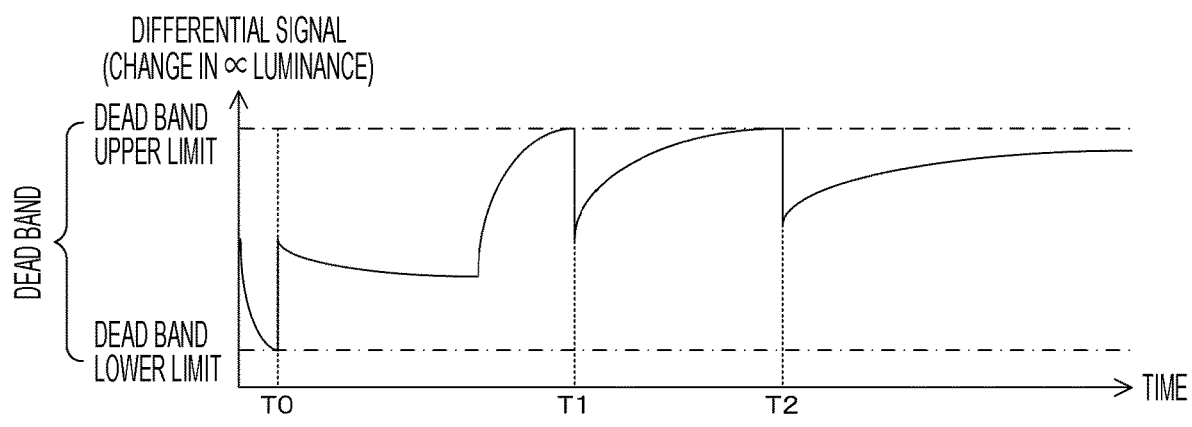
Figure 9:
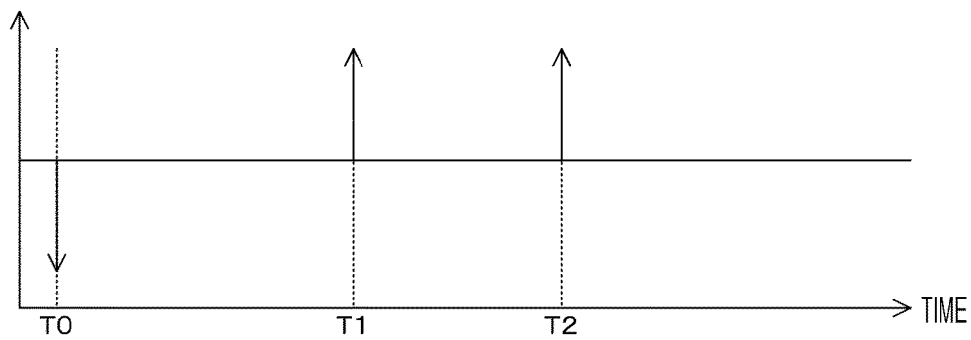

FIG. 9 is a graph showing an example of changes in a voltage signal, a differential signal, and a detection signal after widening the dead band in the first embodiment of the present technology. Here, a of FIG. 8 is a graph showing an example of changes in a voltage signal of a pixel, and b of FIG. 8 is a graph showing an example of changes in a differential signal of the pixel. Here, c of FIG. 8 is a graph showing an example of changes in a detection signal of the pixel. In a of FIG. 9, the vertical axis indicates the level of the voltage signal, and the horizontal axis indicates time. In b of FIG. 9, the vertical axis indicates the level of the differential signal, and the horizontal axis indicates time. In c of FIG. 9, the vertical axis indicates the level of the detection signal, and the horizontal axis indicates time.

It is assumed that after the dead band width is changed, changes in luminance similar to those as before the change occur. After the change, at the timing T0, the level of the differential signal falls below the lower limit of the dead band. Additionally, at the timings T1 and T2, the level of the differential signal exceeds the upper limit of the dead band. Hence, an off event is detected at timing the T0, and an on event is detected at timings the T1 and T2. As described above, since the detection sensitivity for an address event is lowered than that before widening the dead band, the number of times of detecting the address event becomes smaller.

Figure 10:
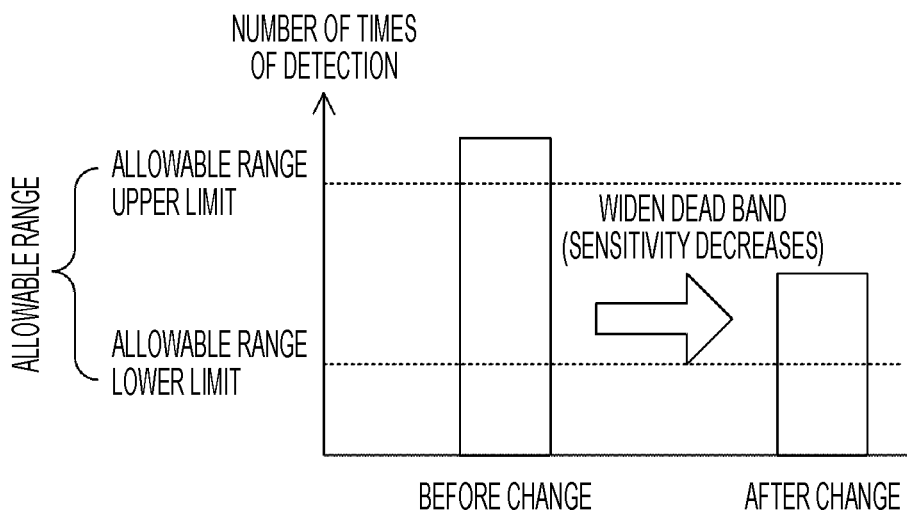
FIG. 10 is a diagram showing an example of the number of times of detection before and after changing the dead band width in the first embodiment of the present technology.
Figure 10:
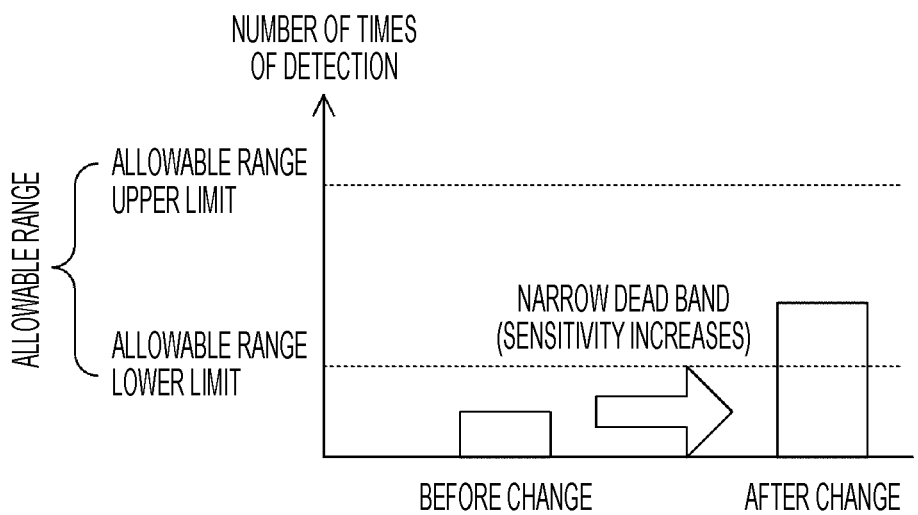

FIG. 10 is a diagram showing an example of the number of times of detection before and after changing the dead band width in the first embodiment of the present technology. Here, a of FIG. 10 is a histogram showing an example of the number of times of detection in each unit cycle before and after widening the dead band. Here, b of FIG. 10 is a histogram showing an example of the number of times of detection in each unit cycle before and after narrowing the dead band.

In a case where the number of times of detection is greater than the upper limit of the allowable range, the bias controller 223 widens the dead band. As a result, the detection sensitivity for the address event is reduced, and the number of times of detection becomes smaller than that before changing the dead band width.

On the other hand, in a case where the number of times of detection is less than the lower limit of the allowable range, the bias controller 223 narrows the dead band. As a result, the detection sensitivity for the address event is increased, and the number of times of detection becomes greater than that before changing the dead band width.

As described above, since the bias controller 223 increases or decreases the width of the dead band according to the number of times of detection, the width of the dead band can be set to an appropriate range.

For example, assume a case where the brightness of the entire screen changes due to a change in illumination. In this case, since the brightness of all pixels changes, if the dead band is too narrow, an address event may be detected in all pixels. As the number of times of detecting the address event increases, the load of the circuit that transfers the detection signal and the circuit that processes the detection signal increases, which may increase the power consumption of the solid-state image sensor 200 as a whole. However, since the bias controller 223 widens the dead band as the number of times of detection increases, it is possible to curb excessive detection of address events and reduce power consumption.

Additionally, consider a case where a change in luminance occurs in some of all pixels and the change amount is small. In this case, if the dead band is too wide, there is a possibility that the address event cannot be detected in the pixel where the change has occurred, and the address event is missed. However, since the bias controller 223 narrows the dead band as the number of times of detection decreases, it is possible to prevent the address event from being missed.

Operation Example of Solid-state Image Sensor

Figure 11:
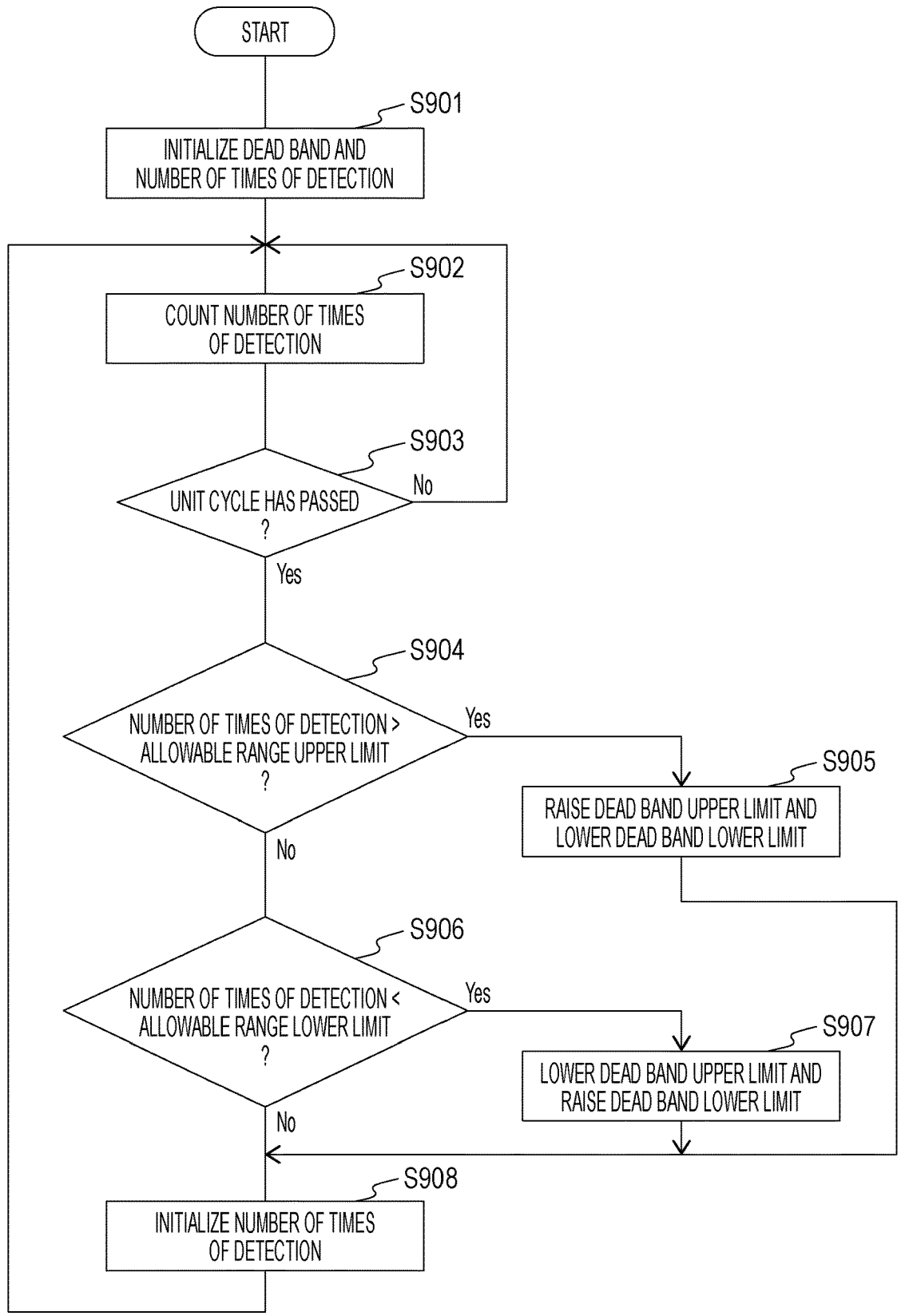
FIG. 11 is a flowchart showing an example of the operation of the solid-state image sensor of the first embodiment of the present technology.

FIG. 11 is a flowchart showing an example of the operation of the solid-state image sensor 200 of the first embodiment of the present technology. The operation is started when a predetermined application for detecting an address event is executed.

The signal processing unit 220 in the solid-state image sensor 200 initializes the upper and lower limits of the dead band and the number of times of detection (step S901). Then, the signal processing unit 220 counts the number of times of detecting the address event (step S902), and determines whether or not the unit cycle has passed (step S903). If the unit cycle has not passed (step S903: No), the signal processing unit 220 repeats step S902.

On the other hand, if the unit cycle has passed (step S903: Yes), the signal processing unit 220 determines whether or not the number of times of detection is greater than the upper limit of the allowable range (step S904). If the number of times of detection is greater than the upper limit of the allowable range (step S904: Yes), the signal processing unit 220 raises the dead band upper limit and lowers the dead band lower limit to widen the dead band (step S905).

If the number of times of detection is equal to or less than the upper limit of the allowable range (step S904: No), the signal processing unit 220 determines whether or not the number of times of detection is less than the lower limit of the allowable range (step S906). If the number of times of detection is less than the lower limit of the allowable range (step S906: Yes), the signal processing unit 220 lowers the dead band upper limit and raises the dead band lower limit to narrow the dead band (step S907).

If the number of times of detection is a value within the allowable range (step S906: No), the signal processing unit 220 initializes the number of times of detection (step S908), and repeats step S902 and subsequent steps. Additionally, the signal processing unit 220 also executes step S908 after step S905 or S907.

As described above, according to the first embodiment of the present technology, since the signal processing unit 220 controls the width of the dead band according to the number of times of detecting the address event, the detection sensitivity for the address event can be controlled to an appropriate value.

2. Second Embodiment

In the above-described first embodiment, the signal processing unit 220 controls the bias voltage of all pixels to the same value. However, with this configuration, the detection sensitivity for the address event may be inappropriate for some scenes. For example, in a case where the brightness of a part of the pixel array unit 213 changes due to a change in illumination, address events are excessively detected in that part. A solid-state image sensor 200 of a second embodiment is different from the first embodiment in that a pixel array unit 213 is divided into multiple areas and the bias voltage is controlled for each area.

Figure 12:
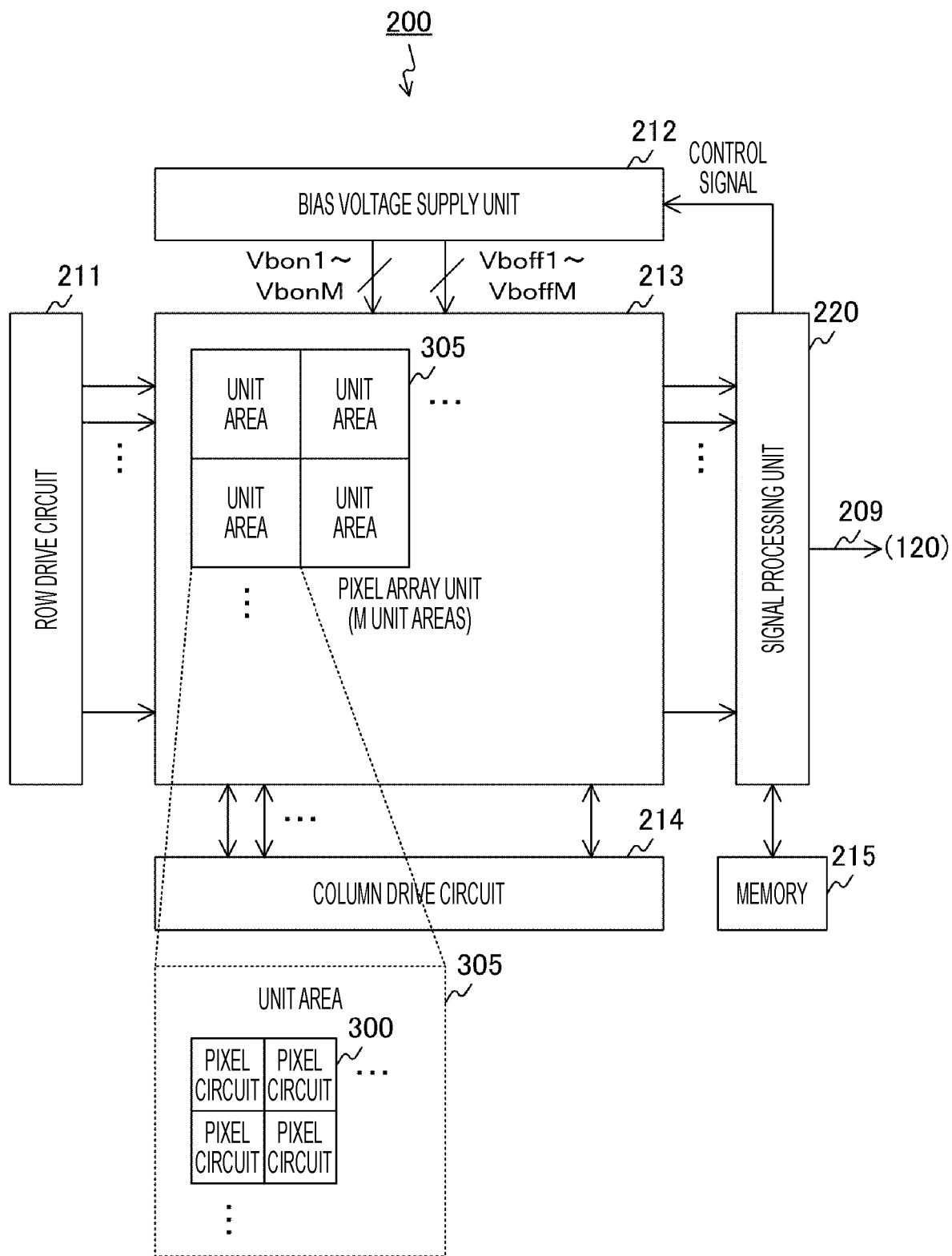
FIG. 12 is a block diagram showing a configuration example of a solid-state image sensor of a second embodiment of the present technology.

FIG. 12 is a block diagram showing a configuration example of the solid-state image sensor 200 of the second embodiment of the present technology. The solid-state image sensor 200 of the second embodiment is different from the first embodiment in that the pixel array unit 213 is divided into M (M is an integer of 2 or more) unit areas 305. In each of the unit areas 305, pixel circuits 300 of I rows×J columns (I and J are integers) are arranged.

Additionally, a signal processing unit 220 of the second embodiment counts the number of times of detection for each unit area 305, and controls the bias voltage according to the number of times of detection. Additionally, a bias voltage supply unit 212 of the second embodiment supplies bias voltages Vbon1 to VbonM and bias voltages Vboff1 to VboffM. A bias voltage Vbonm and a bias voltage Vboffm (m is an integer from 1 to M) are supplied to the m-th unit area 305.

FIG. 13 is a diagram showing an example of information held in a memory 215 in the second embodiment of the present technology. The memory 215 holds the number of times of detection, the dead band upper limit, and the dead band lower limit for each of the M unit areas 305.

For example, assume that the number of times of detection in a unit cycle of an area whose area identification number for identifying the unit area 305 is "01" is "15", and the number of times of detection is within the allowable range. Additionally, assume that the number of times of detection in a unit cycle of an area whose area identification number is "02" is "0", and the number of times of detection is less than the lower limit of the allowable range. In this case, the signal processing unit 220 does not change the dead band upper limit and lower limit of the area whose area identification number is "01". On the other hand, as for the area whose area identification number is "02", the signal processing unit 220 lowers the dead band upper limit "UO2" and raises the dead band lower limit "L02".

As described above, according to the second embodiment of the present technology, since the signal processing unit 220 controls the dead band width according to the number of times of detecting the address event for each unit area, the detection sensitivity of each unit area can be controlled to an appropriate value.

3. Example of Application to Movable Body

The technology of the present disclosure (present technology) can be applied to various products. For example, the technology of the present disclosure may be implemented as a device mounted on any type of movable bodies including a car, an electric car, a hybrid electric car, a motorcycle, a bicycle, a personal mobility, an airplane, a drone, a ship, a robot, and the like.

Figure 14:
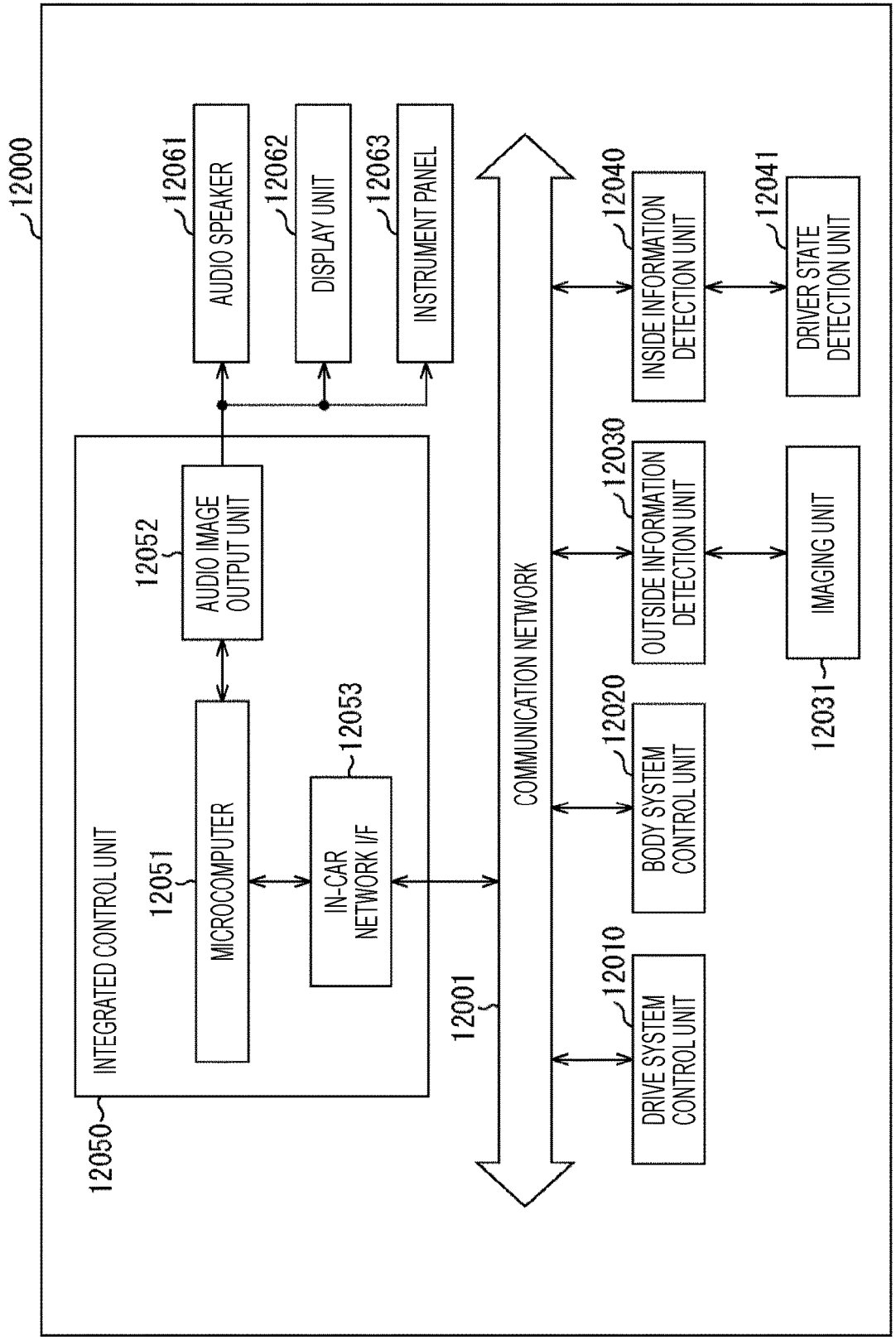
FIG. 14 is a block diagram showing a schematic configuration example of a vehicle control system.

FIG. 14 is a block diagram showing a schematic configuration example of a vehicle control system which is an example of a mobile control system to which the technology according to the present disclosure can be applied.

A vehicle control system 12000 includes multiple electronic control units connected through a communication network 12001. In the example shown in FIG. 14, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output unit 12052, and an in-car network interface (I/F) 12053 are illustrated.

The drive system control unit 12010 controls the operation of devices related to the drive system of the vehicle according to various programs. For example, the drive system control unit 12010 functions as a controller of devices including a drive force generation device for generating a drive force of a vehicle such as an internal combustion engine or a drive motor, a drive force transmission mechanism for transmitting the drive force to wheels, a steering mechanism that adjusts the steering angle of the vehicle, and a braking device that generates a braking force of the vehicle.

The body system control unit 12020 controls the operation of various devices equipped on the vehicle body according to various programs. For example, the body system control unit 12020 functions as a controller of a keyless entry system, a smart key system, a power window device, or a controller of various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp, and the like of the vehicle.

The outside information detection unit 12030 detects information on the outside of the vehicle equipped with the vehicle control system 12000. For example, an imaging unit 12031 is connected to the outside information detection unit 12030. The outside information detection unit 12030 causes the imaging unit 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging unit 12031 is an optical sensor that receives light and outputs an electrical signal corresponding to the amount of light received. The imaging unit 12031 can output an electric signal as an image or can output the electrical signal as distance measurement information. Additionally, the light received by the imaging unit 12031 may be visible light or non-visible light such as infrared light.

The inside information detection unit 12040 detects information on the inside of the vehicle. For example, a driver state detection unit 12041 that detects a state of a driver is connected to the inside information detection unit 12040. The driver state detection unit 12041 includes a camera for capturing an image of the driver, for example, and the inside information detection unit 12040 may calculate the degree of fatigue or concentration of the driver or determine whether or not the driver is asleep, on the basis of the detection information input from the driver state detection unit 12041.

The microcomputer 12051 can calculate a control target value of the drive force generation device, the steering mechanism, or the braking device on the basis of the information on the outside or the inside of the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, or the like.

Additionally, the microcomputer 12051 can output a control command to the body system control unit 12020 on the basis of the information on the outside of the vehicle acquired by the outside information detection unit 12030. For example, the microcomputer 12051 can control the headlamp according to the position of the preceding vehicle or oncoming vehicle detected by the outside information detection unit 12030, and perform coordinated control aimed for glare prevention such as switching from high beam to low beam.

The audio image output unit 12052 transmits an output signal of at least one of audio or image to an output device capable of visually or aurally notifying a passenger or the outside of a vehicle of information. In the example of FIG. 14, an audio speaker 12061, a display unit 12062, and an instrument panel 12063 are illustrated as examples of the output device. The display unit 12062 may include at least one of an onboard display or a head-up display, for example.

Figure 15:
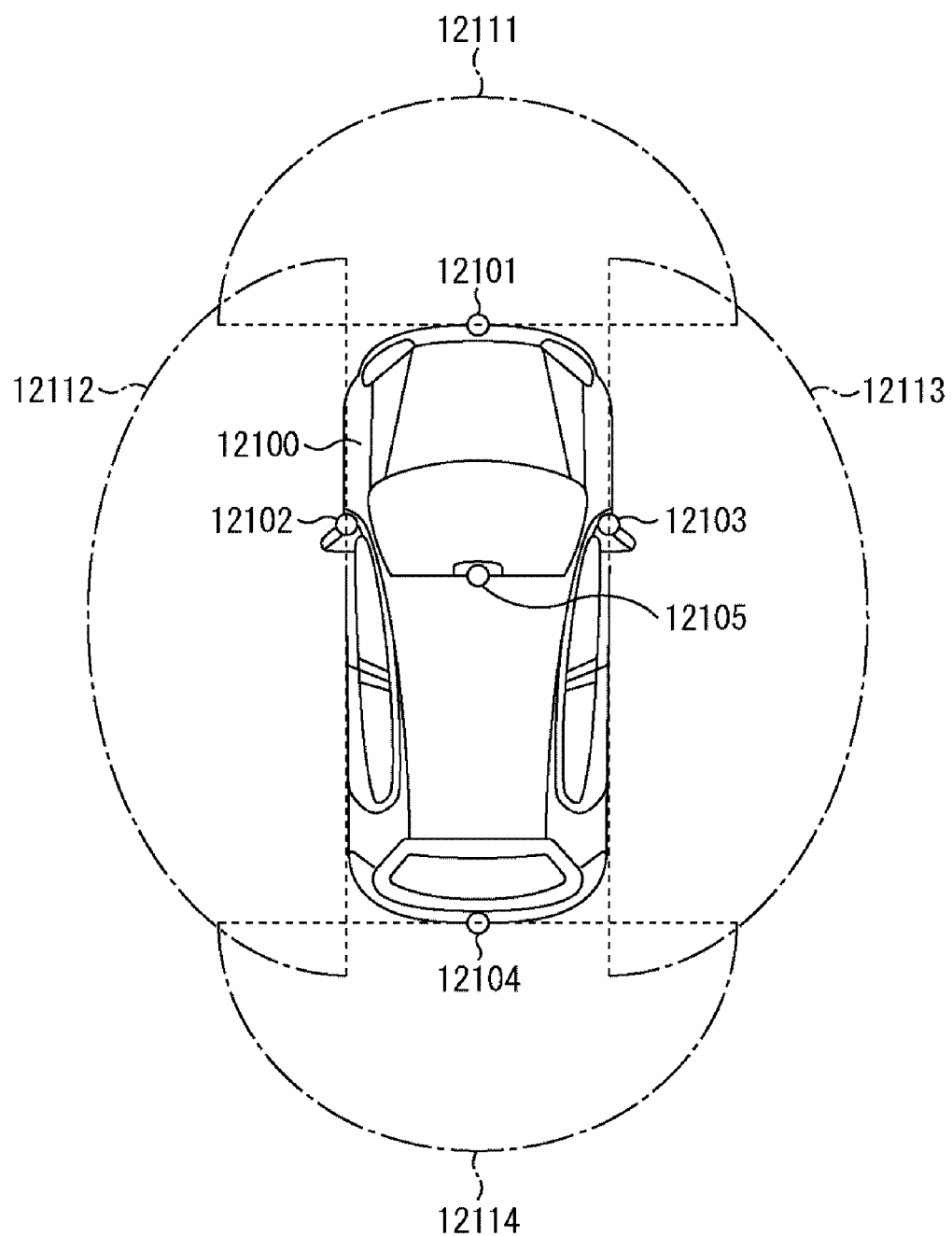
FIG. 15 is an explanatory diagram showing an example of an installation position of an imaging unit.

FIG. 15 is a diagram showing an example of the installation position of the imaging unit 12031.

In FIG. 15, imaging units 12101, 12102, 12103, 12104, and 12105 are included as the imaging unit 12031.

For example, the imaging units 12101, 12102, 12103, 12104, and 12105 are provided in positions such as a front nose, a side mirror, a rear bumper, a back door, and an upper portion of a windshield in the vehicle interior of the vehicle 12100. The imaging unit 12101 provided on the front nose and the imaging unit 12105 provided on the upper portion of the windshield in the vehicle interior mainly acquire images of the front of the vehicle 12100. The imaging units 12102 and 12103 provided on the side mirrors mainly acquire images of the side of the vehicle 12100. The imaging unit 12104 provided on the rear bumper or the back door mainly acquires an image of the rear of the vehicle 12100. The imaging unit 12105 provided on the upper portion of the windshield in the vehicle interior is mainly used to detect a preceding vehicle or a pedestrian, an obstacle, a traffic light, a traffic sign, a lane, or the like.

Note that FIG. 15 shows an example of imaging ranges of the imaging units 12101 to 12104. An imaging range 12111 indicates the imaging range of the imaging unit 12101 provided on the front nose, imaging ranges 12112 and 12113 indicate the imaging ranges of the imaging units 12102 and 12103 provided on the respective side mirrors, and an imaging range 12114 indicates the imaging range of the imaging unit 12104 provided on the rear bumper or the back door. For example, by superimposing the pieces of image data captured by the imaging units 12101 to 12104, a bird's eye view image of the vehicle 12100 as viewed from above can be obtained.

At least one of the imaging units 12101 to 12104 may have a function of acquiring distance information. For example, at least one of the imaging units 12101 to 12104 may be a stereo camera including multiple imaging elements, or may be an imaging element having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging units 12101 to 12104, to extract, as a preceding vehicle, the closest three-dimensional object on the traveling path of the vehicle 12100 in particular, the three-dimensional object traveling at a predetermined speed (e.g., 0 km/h or more) in substantially the same direction as the vehicle 12100. Moreover, the microcomputer 12051 can set an inter-vehicle distance to be secured in advance with respect to the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, or the like.

For example, on the basis of the distance information obtained from the imaging units 12101 to 12104, the microcomputer 12051 can extract three-dimensional object data regarding three-dimensional objects by classifying the data into three-dimensional objects such as two-wheeled vehicle, ordinary vehicle, large vehicle, pedestrian, and telephone pole, and use the data for automatic avoidance of obstacles. For example, the microcomputer 12051 identifies obstacles around the vehicle 12100 into obstacles visible to the driver of the vehicle 12100 and obstacles hardly visible to the driver of the vehicle 12100. Then, the microcomputer 12051 can determine the collision risk indicating the degree of risk of collision with each obstacle, and when the collision risk is a setting value or more and there is a possibility of a collision, can perform driving support for collision avoidance by outputting a warning to the driver through the audio speaker 12061 or the display unit 12062, or by performing forcible deceleration or avoidance steering through the drive system control unit 12010.

At least one of the imaging units 12101 to 12104 may be an infrared camera that detects infrared light. For example, the microcomputer 12051 can recognize a pedestrian by determining whether or not a pedestrian is present in the images captured by the imaging units 12101 to 12104. Such pedestrian recognition is performed by a procedure of extracting feature points in images captured by the imaging units 12101 to 12104 as infrared cameras, and a procedure of performing pattern matching processing on a series of feature points indicating the outline of an object to determine whether or not the object is a pedestrian, for example. When the microcomputer 12051 determines that a pedestrian is present in the images captured by the imaging units 12101 to 12104 and recognizes the pedestrian, the audio image output unit 12052 causes the display unit 12062 to superimpose a square outline for emphasis on the recognized pedestrian. Additionally, the audio image output unit 12052 may cause the display unit 12062 to display an icon or the like indicating a pedestrian in a desired position.

Hereinabove, one example of the vehicle control system to which the technology of the present disclosure can be applied has been described. Of the above-described configuration, the technology according to the present disclosure is applicable to the imaging unit 12031, for example. Specifically, the imaging device 100 of FIG. 1 can be applied to the imaging unit 12031. By applying the technology according to the present disclosure to the imaging unit 12031, it is possible to control the detection sensitivity for the address event to an appropriate value and improve the reliability of the vehicle control system.

Note that the above-described embodiments are an example for embodying the present technology, and the matters in the embodiments and the matters specifying the invention in "CLAIMS" have a corresponding relationship. Similarly, the matters specifying the invention in "CLAIMS" and the matters having the same names in the embodiments of the present technology have a correspondence relationship. Note, however, that the present technology is not limited to the embodiments, and can be embodied by variously modifying the embodiments without departing from the gist of the present technology.

Additionally, the processing procedure described in the above embodiments may be regarded as a method including a series of these procedures, or may be regarded as a program for causing a computer to execute the series of procedures or a recording medium storing the program. As the recording medium, for example, a compact disc (CD), a minidisc (MD), a digital versatile disc (DVD), a memory card, a Blu-ray (registered trademark) disc, or the like can be used.

Note that the effect described in the present specification is merely an illustration and is not restrictive, and other effects can be obtained.

Note that the present technology can also be configured in the following manner.

(1) A solid-state image sensor including:

a pixel array unit in which multiple pixel circuits are arranged, each pixel circuit detecting a change in luminance of incident light occurring outside a predetermined dead band as an address event; and a control unit that controls a width of the dead band according to the number of times the address event is detected in the pixel array unit within a fixed unit cycle.

(2) The solid-state image sensor according to (1) above, in which the control unit widens the dead band as the number of times of detection increases.

(3) The solid-state image sensor according to (1) or (2) above, in which each of the multiple pixel circuits compares each of an upper limit and a lower limit of the dead band with an amount of change in the luminance, and detects the address event on the basis of the comparison result.

(4) The solid-state image sensor according to any one of (1) to (3) above, in which the control unit controls the width of the dead band in a case where the number of times of detection is outside a predetermined allowable range.

(5) The solid-state image sensor according to any one of (1) to (4) above, in which the pixel array unit is divided into multiple areas, and the control unit controls the width of the dead band for each of the multiple areas.

(6) The solid-state image sensor according to any one of (1) to (5) above, in which each of the multiple pixel circuits includes a photoelectric conversion element that photoelectrically converts the incident light to generate a photocurrent, and a current-voltage conversion circuit that converts the photocurrent into a voltage, the photoelectric conversion element is arranged on a light receiving chip, and the current-voltage conversion circuit is arranged on a detection chip laminated on the light receiving chip.

(7) An imaging device including:

a pixel array unit in which multiple pixel circuits are arranged, each pixel circuit detecting a change in luminance of incident light occurring outside a predetermined dead band as an address event;

a control unit that controls a width of the dead band according to the number of times the address event is detected in the pixel array unit within a fixed unit cycle; and a recording unit that records data obtained from a detection result of the address event.

(8) A method of controlling a solid-state image sensor, including:

a counting procedure of counting the number of times an address event is detected within a fixed unit cycle in a pixel array unit in which multiple pixel circuits are arranged, each pixel circuit detecting a change in luminance of incident light occurring outside a predetermined dead band as the address event; and a control procedure of controlling a width of the dead band according to the number of times of detection.

REFERENCE SIGNS LIST

100 Imaging device
110 Imaging lens
120 Recording unit
130 Imaging control unit
200 Solid-state image sensor
201 Light receiving chip
202 Detection chip
211 Row drive circuit
212 Bias voltage supply unit
213 Pixel array unit
214 Column drive circuit
215 Memory
220 Signal processing unit
221 Image processor
222 Detection counter
223 Bias controller
300 Pixel circuit
301 Photoelectric conversion element
305 Unit area
310 Current-voltage conversion circuit
311, 313, 335, 342, 344 N-type transistor
312, 321, 322, 332, 334, 341, 343 P-type transistor
320 Buffer
330 Subtractor
331, 333 Capacitor
340 Quantizer
350 Transfer circuit
12031 Imaging unit

The invention claimed is:

1. A solid-state image sensor comprising:
a pixel array in which a plurality of pixel circuits is arranged, each pixel circuit detecting a change in luminance of incident light occurring outside a predetermined dead band as an address event; and
a processor configured to control a width of the dead band according to the number of times the address event is detected in the pixel array within a fixed unit cycle.

2. The solid-state image sensor according to claim 1, wherein
the processor widens the dead band as the number of times of detection increases.

3. The solid-state image sensor according to claim 1, wherein
each of the plurality of pixel circuits compares each of an upper limit and a lower limit of the dead band with an amount of change in the luminance, and detects the address event on a basis of the comparison result.

4. The solid-state image sensor according to claim 1, wherein
the processor controls the width of the dead band in a case where the number of times of detection is outside a predetermined allowable range.

5. The solid-state image sensor according to claim 1, wherein
the pixel array is divided into a plurality of areas, and the processor controls the width of the dead band for each of the plurality of areas.

6. The solid-state image sensor according to claim 1, wherein
each of the plurality of pixel circuits includes
a photoelectric conversion element that photoelectrically converts the incident light to generate a photocurrent, and a
current-voltage conversion circuit that converts the photocurrent into a voltage,
the photoelectric conversion element is arranged on a light receiving chip, and
the current-voltage conversion circuit is arranged on a detection chip laminated on the light receiving chip.

7. An imaging device comprising:
a pixel array in which a plurality of pixel circuits is arranged, each pixel circuit detecting a change in luminance of incident light occurring outside a predetermined dead band as an address event;
a processor configured to control a width of the dead band according to the number of times the address event is detected in the pixel array within a fixed unit cycle; and
a memory configured to record data obtained from a detection result of the address event.

8. The imaging device according to claim 7, wherein the processor widens the dead band as the number of times of detection increases.

9. The imaging device according to claim 7, wherein each of the plurality of pixel circuits compares each of an upper limit and a lower limit of the dead band with an amount of change in the luminance, and detects the address event on a basis of the comparison result.

10. The imaging device according to claim 7, wherein the processor controls the width of the dead band in a case where the number of times of detection is outside a predetermined allowable range.

11. The imaging device according to claim 7, wherein the pixel array is divided into a plurality of areas, and the processor controls the width of the dead band for each of the plurality of areas.

12. The imaging device according to claim 7, wherein each of the plurality of pixel circuits includes:
a photoelectric conversion element that photoelectrically converts the incident light to generate a photocurrent, and a
current-voltage conversion circuit that converts the photocurrent into a voltage,
the photoelectric conversion element is arranged on a light receiving chip, and
the current-voltage conversion circuit is arranged on a detection chip laminated on the light receiving chip.

13. A method of controlling a solid-state image sensor, comprising:
counting the number of times an address event is detected within a fixed unit cycle in a pixel array in which a plurality of pixel circuits is arranged, each pixel circuit detecting a change in luminance of incident light occurring outside a predetermined dead band as the address event; and
controlling a width of the dead band according to the number of times of detection.

14. The method according to claim 13, wherein controlling the width of the dead band comprises widening the dead band as the number of times of detection increases.

* * * * *